(No Model.)
E. A. WARREN.
FLY HOOK.
No. 361,099. Patented Apr. 12, 1887.
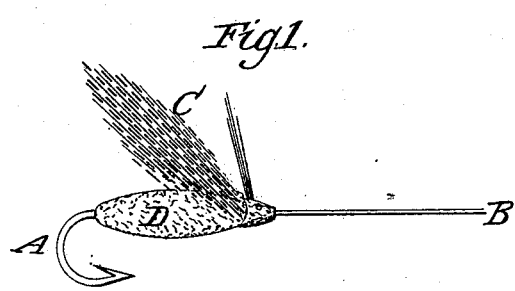
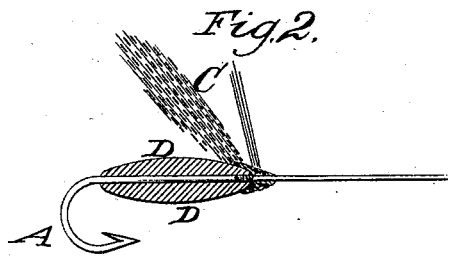 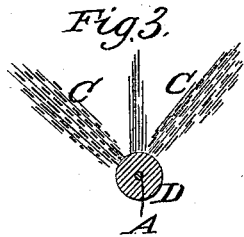
Witnesses.
Emil P Certin
C. L. Sundgren
Inventor:
Edmond A. Warren
by his Attys
Brown & Hall

UNITED STATES PATENT OFFICE.

EDMOND A. WARREN, OF BROOKLYN, NEW YORK, ASSIGNOR TO HIMSELF AND THOMAS J. MOORE, OF SAME PLACE.

FLY-HOOK.

SPECIFICATION forming part of Letters Patent No. 361,099, dated April 12, 1887.

Application filed January 4, 1887. Serial No. 223,258. (No model.)

*To all whom it may concern:*

Be it known that I, EDMOND A. WARREN, of Brooklyn, in the county of Kings and State of New York, have invented a new and useful Improvement in Fly-Hooks, of which the following is a specification.

A trolling-hook or trolling-bait has heretofore been provided with a float, in order to counteract the weight of the device and prevent it from sinking when drawn through the water; but the ordinary fly-hooks which comprise flexible members simulating the wings of a fly and liable to soon become waterlogged when in use have never been provided with any attachment or so constructed as to prevent their sinking after being in the water a very short time.

The object of my invention is to provide a fly-hook which will not be open to the objections above stated; and the invention consists in a fly or fly-hook having flexible members, as usual, and a body portion which simulates the body of the fly, and is made of buoyant non-absorbent material to constitute a float.

In the accompanying drawings, Figure 1 represents a fly or fly-hook embodying my invention. Fig. 2 is a similar view showing the body of the fly, which constitutes the float, in section; and Fig. 3 is a transverse section of the fly.

Similar letters of reference designate corresponding parts in the several figures.

A designates the hook proper, to which the snell or gut B is attached; and C D designate, respectively, the flexible fly members, which are secured to the hook and the body of the fly.

The fly may be of any suitable construction, and the flexible members of any desired character; and my invention relates wholly to a float, which, as here represented, simulates the body D of the fly. This float or body D may be advantageously made of cork; but in lieu thereof any other suitable buoyant non-absorbent material which is lighter than water, and which will not sink, may be employed. The combination of a float with a fish-hook or artificial fly is very advantageous, because it will prevent the fly from sinking after being in the water but a short time, and therefore makes the fly a better lure to the fish.

I am aware that trolling-hooks have been provided with floats for relieving them of the weight of heavy trolling-spoons or other devices, and to keep them at or near the surface when drawn through the water; and I am also aware that a trolling-bait has been made in the form of a hollow body simulating a mouse or other animal. I am also aware of United States Letters Patent granted May 20, 1873, to J. Mullaly, which shows and describes a fly-hook having a hook proper arranged in a novel manner relatively to the fly. This patent also states that the wings form a sort of float, but does not describe the wings as different from the ordinary fly-hook or as made of any material to constitute a float, and they would serve as a float, as will the wings of the ordinary artificial fly, only until they become wet or water-soaked. I therefore do not include such a device in my invention, but desire to restrict the scope of my invention to a fly-hook having the usual flexible members simulating the wings of a fly, and having a portion which simulates the body of the fly made to constitute a float.

What I claim as my invention, and desire to secure by Letters Patent, is—

The fly herein described, having the flexible members C, simulating the wings of the fly, and the portion D, which simulates the body of the fly, made of buoyant non-absorbent material to constitute a float for the fly, substantially as herein set forth.

EDMOND A. WARREN.

Witnesses:
 FREDK. HAYNES,
 C. E. LUNDGREN.